United States Patent [19]

Kevorkian et al.

[11] Patent Number: 5,028,768

[45] Date of Patent: Jul. 2, 1991

[54] SYSTEM FOR READING AND ENCODING A MAGNETIC TRACK CARRIED BY A MANUALLY-DISPLACED SUPPORTING DOCUMENT

[75] Inventors: Jean-Michel Kevorkian, Dourdan; Jacques Smeets, La Ferte Alais, both of France

[73] Assignee: Societe Anonyme dite: Compagnie Generale d'Automatise CGA HBS, Paris, France

[21] Appl. No.: 410,448

[22] Filed: Sep. 21, 1989

[30] Foreign Application Priority Data

Sep. 27, 1988 [FR] France ............................. 88 12608

[51] Int. Cl.$^5$ ............................................. G06F 7/08
[52] U.S. Cl. ................................... 235/449; 235/487; 235/493
[58] Field of Search ......................... 235/449, 487, 493

[56] References Cited

U.S. PATENT DOCUMENTS

| 3,869,700 | 3/1975 | Cook et al. ..................... 340/149 A |
| 4,024,379 | 5/1977 | Pfost et al. ........................ 235/61 B |
| 4,225,780 | 9/1980 | Jacob et al. ......................... 235/449 |
| 4,228,348 | 10/1980 | Lee ...................................... 235/449 |
| 4,304,992 | 12/1981 | Kobayashi et al. ................. 235/449 |
| 4,507,550 | 3/1985 | Fleer .................................. 235/449 |
| 4,645,916 | 2/1987 | Raisleger ............................ 235/449 |

OTHER PUBLICATIONS

IBM Technical Disclosure Bulletin, vol. 22, No. 11, Apr. 1980, p. 4869, J. E. Rohen: "Bidirectional Slot Encoder".

Primary Examiner—Harold Pitts
Attorney, Agent, or Firm—Sughrue, Mion, Zinn, Macpeak & Seas

[57] ABSTRACT

A system for reading and encoding a magnetic track (2) carried by a supporting document (1) which is displaced manually past read and write members, the magnetic track comprising a first portion (3) on which a fixed first encoded message characteristic of the supporting document is recorded, said message being encoded by means of an encoding system which conveys its own clock signal, the first portion of the track being followed by a second portion (6) in which a variable second encoded message is written each time the supporting document goes past said read and write members, wherein the read and write members comprise three magnetic heads in alignment, comprising a first head (9) which is a read head, a second head (10) which is a write head, and a third head (11) which is a read head, the write head (10) being connected to a write signal generator (12) having a first input (13) which receives data representative of said variable message to be recorded on said second portion of the magnetic track, and a second input (14) on which it receives a clock signal generated by an electronic circuit (15) having an input (16) on which it receives the signals from the said read third head (11), and serving to extract the clock signal from said fixed encoded message recorded on said first portion (3) of the magnetic track (2), the arrival of the clock signal (14) at the write signal generator (12) triggering said writing.

1 Claim, 2 Drawing Sheets

SYSTEM FOR READING AND ENCODING A MAGNETIC TRACK CARRIED BY A MANUALLY-DISPLACED SUPPORTING DOCUMENT

The invention relates to a system for reading and encoding a magnetic track carried by a manually-displaced supporting document.

The invention is applicable, in particular, to tickets having a magnetic track including a fixed ticket-identifying message and a variable message representative of travel units. This particular application thus comprises a transport system using tickets from which deductions are made.

BACKGROUND OF THE INVENTION

Ticket-processing machines exist for processing such ticket, said machines being equipped with motor-driven read/write apparatuses, i.e. users insert their tickets into a chute or slot, after which the tickets are driven automatically to the reader/writer and the ticket is then returned either through an outlet which is separate from the inlet, or else via the inlet itself after being reversed.

There also exist ticket-processing machines through which travellers themselves displace their tickets along a slideway so that the tickets go past a reader without the travellers letting go their tickets. Ticket machines of this type are used in single charge transport systems which do not deduct credit from a ticket, such machines containing a reader only and not containing a write head.

For writing purposes it is necessary that the linear density of bits in the magnetic coding scheme used should be independent of the speed and any variations in the speed at which a ticket moves past a write head, and this leads to complications when the ticket is displaced manually.

One known solution consists in having a second magnetic track running parallel to the first magnetic track and recording a clock signal on the second track, which solution requires an additional read head to be provided in order to read the clock signal which serves for synchronizing writing and making writing independent of the speed at which the ticket is moving.

An object of the invention is to provide a system enabling a document supporting a magnetic track to be displaced manually and in which a portion of the magnetic track carries a fixed message while another portion carries a variable message, the system not requiring the provision of an additional track with a clock signal and not requiring an additional magnetic head.

A system making use of manual displacement has several advantages. Firstly there is no need to provide a motor, thus enabling complex mechanical items to be avoided, and secondly such a system is less vulnerable to vandalism.

SUMMARY OF THE INVENTION

The present invention provides a system for reading and encoding a magnetic track carried by a supporting document which is displaced manually past read and write members, the magnetic track comprising a first portion on which a fixed first encoded message characteristic of the supporting document is recorded, said message being encoded by means of an encoding system which conveys its own clock signal, the first portion of the track being followed by a second portion in which a variable second encoded message is written each time the supporting document goes past said read and write members, wherein the read and write members comprise three magnetic heads in alignment, comprising a first head which is a read head, a second head which is a write head, and a third head which is a read head, the write head being connected to a write signal generator having a first input which receives data representative of said variable message to be recorded on said second portion of the magnetic track, and a second input on which it receives a clock signal generated by an electronic circuit having an input on which it receives the signals from the said read third head, and serving to extract the clock signal from said fixed encoded message recorded on said first portion of the magnetic track, the arrival of the clock signal at the write signal generator triggering said writing, the linear length of the variable message being no longer than the length of the fixed message, and the distance between the second magnetic head and the third magnetic head being such that writing is not triggered until the end of the fixed message has gone completely past said write second head, and such that there remains a sufficient length of the magnetic track to record the variable message, the distance between the first magnetic head and the second magnetic head being not less than the linear length of the variable message.

BRIEF DESCRIPTION OF THE DRAWINGS

A particular embodiment of the invention is described by way of example in the context of providing travel tickets, the description referring to the accompanying drawings, in which.

DETAILED DESCRIPTION

Figure 1:
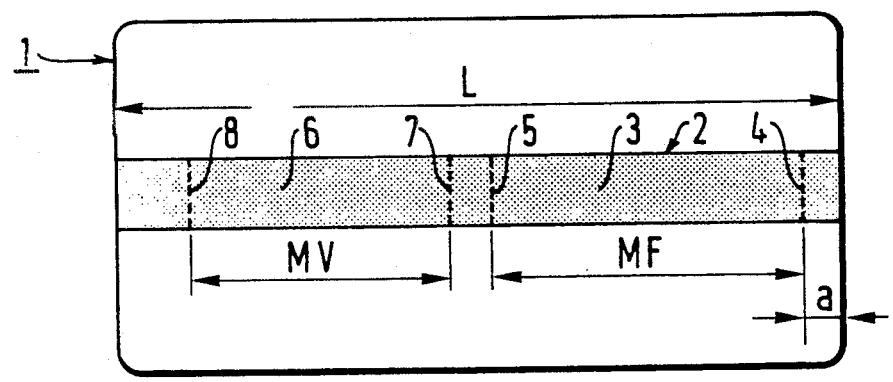
FIG. 1 shows a document supporting a magnetic track and suitable for use as a ticket.

FIG. 1 shows a ticket 1 which includes a magnetic track 2. A fixed and invariable message is recorded on the righthand portion 3 of the track 2. Vertical lines 4 and 5 symbolize the beginning and end of this fixed message and its length is symbolized by the letters MF. The fixed message is a message for validating the ticket. A variable message is recorded on the lefthand portion 6 of the magnetic track, and this message is written onto the track each time the ticket moves past the reading and encoding system located in a ticket-processing machine giving access to an enclosure that allows transport means to be used. The variable message is constituted by a code representative, for example, of a certain number of travel units, with said number being decremented each time the ticket goes through such a system. Vertical lines 7 and 8 symbolize the beginning and the end of this variable message and its length is symbolized by the letters MV. The letter L symbolizes the total length of the magnetic track 2, and the letter a symbolizes the length of the track ahead of the beginning of the fixed message. The fixed message MF is encoded by means of an encoding system which also automatically includes its own clock, e.g. by means of the F/2F code, split phase code, etc.

Figure 2:
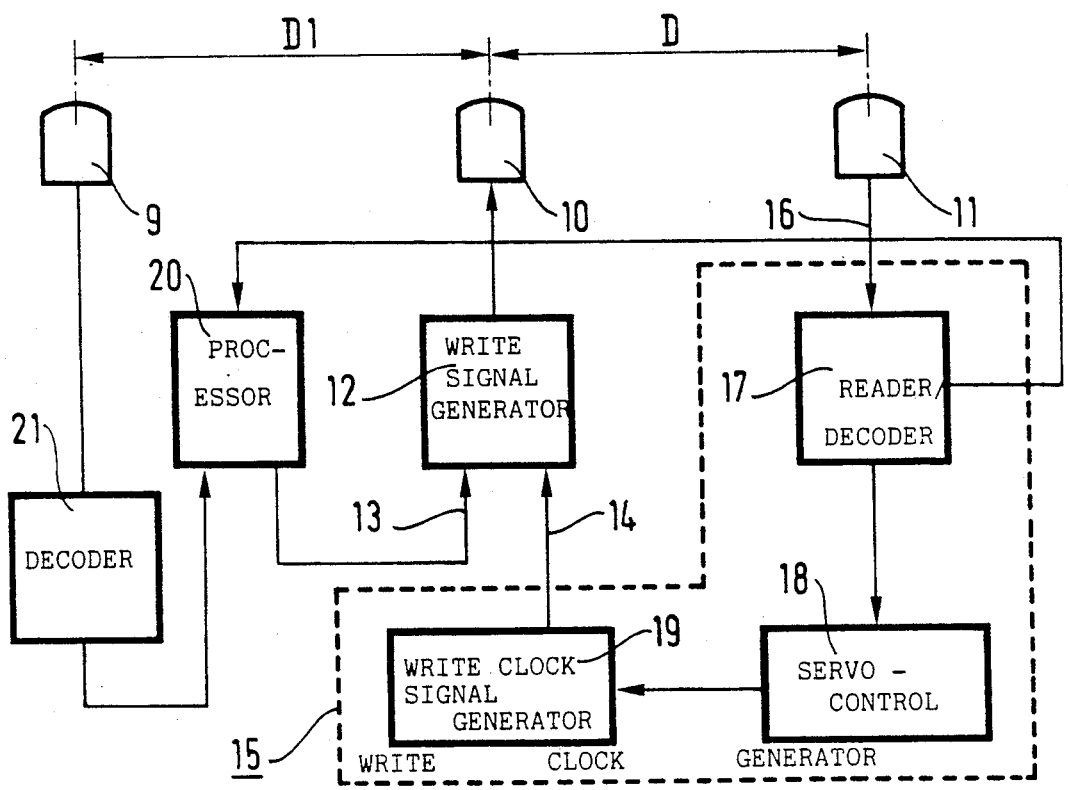
FIG. 2 is a block diagram of a system in accordance with the invention suitable for reading and writing on the magnetic track of the document shown in FIG. 1 with the document being manually displaced past the read and write members of the system.

With reference to FIG. 2, the reading and encoding system firstly includes read and write members comprising three magnetic heads in alignment. A first magnetic head 9 is a read head, a second magnetic head 10 is a write head, and a third magnetic head 11 is a read head.

The write head 10 receives a write signal produced by a write signal generator 12 having a first input 13 which receives variable data to be recorded on the portion 6 of the magnetic track 2, and a second input 14 which receives a write clock signal generated by an electronic circuit 15. The variable data applied to the input 13 are provided by a processor module 20. The processor module 20 receives information from a decoder module 21 connected to the first read head 9. The electronic circuit 15 has an input 16 which receives signals from read head 11. It comprises, firstly, a reader/decoder module 17. When the fixed message MF goes past the read head 11, the magnetic transitions in the fixed message recorded on the track are read and decoded in this module, and the clock signal is separated from the data extracted from the received signal. The electronic circuit 15 then includes a servo-control module 18. Depending on the speed at which the ticket 1 moves past the read head 11, the time intervals between the various bits sensed by the head 11 vary. The module 18 measures the time intervals between successive transitions and re-establishes a clock rate for use in establishing a write clock signal.

Finally, the electronic circuit 15 includes a write clock signal generator 19 which produces a clock signal that is servo-controlled to the speed at which the ticket 1 is travelling, said signal being based on calculations performed subsequently to the analysis performed by the servo-control module 18. The reader and decoder module 17 is also connected to the processor module 20.

When the write clock signal appears on the second input 14 of the write signal generator 12, and providing data is present on the first input 13, the generator 12 generates a write signal.

The entire system is disposed in a ticket processing machine with all three magnetic heads 9, 10, and 11 being disposed in alignment facing a longitudinal slot along which a traveller manually slides a ticket 1.

Figure 3:
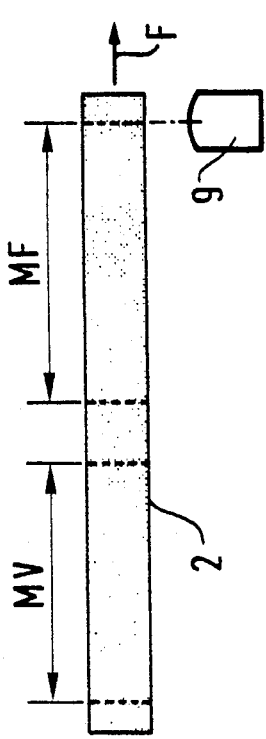
FIGS. 3, 4, and 5 are diagrams showing three characteristic positions of the document relative to the magnetic heads while the document is being displaced past said magnetic heads.
Figure 4:
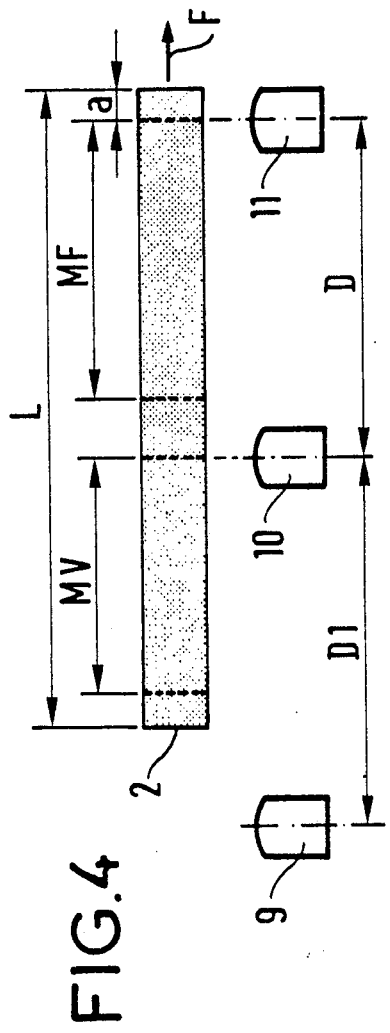
Figure 5:
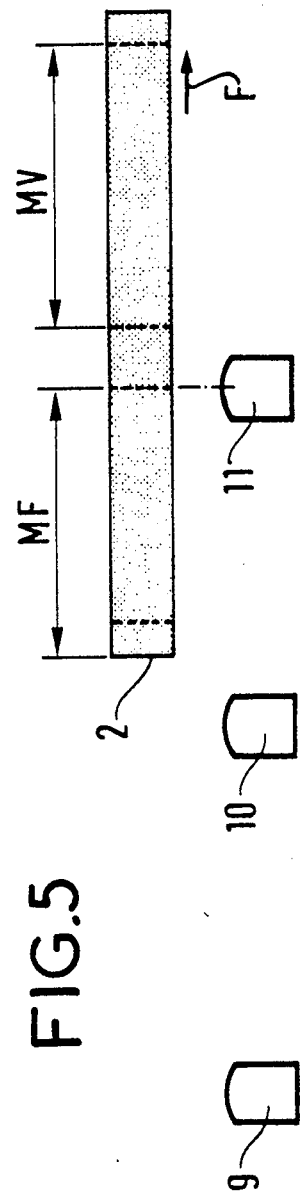

FIGS. 3, 4, and 5 show the various stages in the passage of the ticket past the magnetic heads. These figures show only the magnetic track 2 and the three magnetic heads 9, 10, and 11. Arrow F indicates the direction in which the track-carrying ticket moves.

In the position shown in FIG. 2, the read head 9 begins to read the fixed message MF.

In the position shown in FIG. 4, the beginning of the fixed message MF has reached the read head 11, thereby triggering operation of the write head 10. In this position, the read head 9 has already finished reading both the fixed message MF and the variable message MV of the ticket in full, and the processor module 20 is thus in a position to provide new data to be recorded on input 13.

Finally, in the position shown in FIG. 5, writing of the variable message MV has been completed and the read head 11 has reached the beginning of the newly-recorded variable message MV which is thus verified by means of the reader/decoder module 17 and the processor module 20.

In order to obtain the write clock signal required for writing the variable message MV, which clock signal is generated on the basis of read head 11 reading the fixed message MF, it is necessary for the linear length of the variable message to be no longer than the length of the fixed message. In other words $MV \leq MF$.

Further, the distance D between the second magnetic head 10 and the third magnetic head 11 must be such as to ensure that writing is not triggered before the end of the fixed message has gone completely past the second head 10. It is also necessary for this distance D to be such that there remains a sufficient length of the magnetic track 2 for recording the variable message in full. In other words it is necessary for: $MF \leq D \leq L - (MV + a)$.

Finally, in order to ensure that the processor module 20 can generate the new write data, it is necessary for the read head 9 to have finished reading the variable message MV, and as a result the distance D1 between the read head 9 and the write head 10 must be not less than the length MV of the variable message.

As a safety precaution and in order to avoid any danger of the fixed message being erased by the ticket being moved past the magnetic heads wrongly, a sensor may be used to enable writing only when the write head 10 is in the proper position for writing.

We claim:

1. A system for reading and encoding a magnetic track carried by a supporting document which is displaced manually past read and write members, the magnetic track comprising a first portion on which a fixed first encoded message characteristic of the supporting document is recorded, said message being encoded by means of an encoding system which conveys its own clock signal, the first portion of the track being followed by a second portion in which a variable second encoded message is written each time the supporting document goes past said read and write members, wherein the read and write members comprise three magnetic heads in alignment, comprising a first head which is a read head, a second head which is a write head, and a third head which is a read head, the write head being connected to a write signal generator having a first input which receives data representative of said variable message to be recorded on said second portion of the magnetic track, and a second input on which it receives a clock signal generated by an electronic circuit having an input on which it receives the signals from the said read third head, and serving to extract the clock signal from said fixed encoded message recorded on said first portion of the magnetic track, the arrival of the clock signal at the write signal generator triggering said writing, the linear length of the variable message being no longer than the length of the fixed message, and the distance between the second magnetic head and the third magnetic head being such that writing is not triggered until the end of the fixed message has gone completely past said write second head, and such that there remains a sufficient length of the magnetic track to record the variable message, the distance between the first magnetic head and the second magnetic head being not less than the linear length of the variable message.

* * * * *